United States Patent
Salvador et al.

(10) Patent No.: US 8,226,871 B2
(45) Date of Patent: Jul. 24, 2012

(54) HEAT STAKING PROCESS WITH INCREASED RETENTION FORCE

(75) Inventors: Christopher Salvador, Raymond, OH (US); Oscar Caraan, Raymond, OH (US); Brock Stull, Raymond, OH (US); Takuji Ohara, Raymond, OH (US); Stewart Rich, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 914 days.

(21) Appl. No.: 11/964,204

(22) Filed: Dec. 26, 2007

(65) Prior Publication Data

US 2008/0230948 A1   Sep. 25, 2008

Related U.S. Application Data

(60) Provisional application No. 60/877,744, filed on Dec. 29, 2006.

(51) Int. Cl.
   *B29C 45/14* (2006.01)
(52) U.S. Cl. ......... 264/249; 264/296; 264/273; 264/275
(58) Field of Classification Search .................. None
   See application file for complete search history.

(56) References Cited

U.S. PATENT DOCUMENTS

| | | | | |
|---|---|---|---|---|
| 4,659,268 A | * | 4/1987 | Del Mundo et al. | 411/34 |
| 4,687,394 A | * | 8/1987 | Berecz | 411/361 |
| 4,687,397 A | * | 8/1987 | Berecz | 411/503 |
| 4,687,398 A | * | 8/1987 | Berecz | 411/503 |
| 4,718,801 A | * | 1/1988 | Berecz | 411/378 |
| 4,823,970 A | | 4/1989 | Young | |
| 5,106,249 A | * | 4/1992 | Janotik | 411/43 |
| 5,153,978 A | * | 10/1992 | Simmons | 29/509 |
| 5,354,160 A | * | 10/1994 | Pratt et al. | 411/501 |
| 5,361,483 A | * | 11/1994 | Rainville et al. | 29/524.1 |
| 5,547,413 A | | 8/1996 | Murray | |
| 5,786,047 A | | 7/1998 | Tomblin | |
| 6,560,840 B1 | | 5/2003 | Jenkins et al. | |
| 6,945,683 B2 | | 9/2005 | Gross et al. | |
| 7,025,485 B2 | | 4/2006 | Henry | |
| 7,351,022 B2 | * | 4/2008 | Denslow | 411/501 |
| 2004/0109732 A1 | | 6/2004 | Masterson et al. | |
| 2004/0262954 A1 | | 12/2004 | Scheib et al. | |
| 2005/0006548 A1 | | 1/2005 | Goh et al. | |
| 2005/0168508 A1 | | 8/2005 | Hilton et al. | |
| 2006/0182837 A1 | | 8/2006 | Trinkle | |

* cited by examiner

*Primary Examiner* — Edmund H. Lee
(74) *Attorney, Agent, or Firm* — Mark E. Duell, Esq; Emerson Thomson Bennett

(57) ABSTRACT

A heat staking method and apparatus is provided for use in deforming a heat-stake so that it becomes mechanically coupled to an encapsulate. The deformed portion of the heat-stake contacts a retention component that provides additional composition strength and fastening surface to the encapsulate.

17 Claims, 7 Drawing Sheets

HEAT STAKING PROCESS WITH INCREASED RETENTION FORCE

This application claims priority to U.S. Ser. No. 60/877,744, entitled Increased Molding Retention to Injected Material, filed Dec. 29, 2006, now abandoned, which is incorporated herein by reference.

I. BACKGROUND OF THE INVENTION

A. Field of Invention

This invention pertains to the art of methods and apparatuses regarding the manufacture and assembly of plastic components, and more particularly to methods and apparatuses regarding the heat staking of a plastic molding.

B. Description of the Related Art

With reference to FIGS. 9-10, it is known in the automotive industry to use a heat stalking process to join automotive parts. In one known application, a plurality of first thermoplastic components, commonly referred to as heat-stakes 64, may be located sporadically around the periphery of a first automotive part 60 and a second automotive part 62 may comprise a plurality of second thermoplastic components, commonly referred to as encapsulates 66, comprising receiving holes 68 located in corresponding locations to the heat-stakes of the first automotive part 60. The heat-stakes 64 may be inserted into the receiving holes 68 of the corresponding encapsulates 66 and a staking device (not shown) may be used to heat-treat a leading end 65 of each heat-stake 64. This use of the staking device results in the deformation of the heated leading end of the heat-stake such that a "mushroom cap" 67 may be formed. The mushroom cap 67 of each heat stake 64 commonly covers the corresponding receiving hole 68 of the encapsulate 66. This resulting overlap results in the mechanical coupling of the first and second automotive parts 60, 62. It is known that the resulting retention force of any heat staking process may be dependent upon the amount of surface area of the encapsulate 66 contacted by the heat-stake's mushroom cap 67 as well as the composition states of the encapsulate 66 and heat-stake 64. By "retention force" it is meant the force required to separate, break, or undo the mechanical coupling created by the heat staking process.

Although many known methods of heat staking work well for their intended purposes, various disadvantages exist. One disadvantage relates to the fastening surface of the encapsulate available to contact the mushroom cap of the heat-stake. Commonly the fastening surface available is relatively small. Additionally, the process of heating the leading end of the heat-stake may further reduce the amount of fastening area. When an encapsulate is comprised of a softer composition than that of the heat-stake, the small amount of surface area available for the heat-stake's mushroom head to contact may be insufficient to achieve a high retention force. Often, the heat from the heat staking process tends to melt some of the encapsulate's softer material. This melting may create a loose condition that may further reduce retention force.

What is needed, therefore, is a heat staking process that increases retention force by increasing the amount of fastening area available to contact with the heat-stakes' mushroom cap while also increasing the retention characteristics of the encapsulate.

II. SUMMARY OF THE INVENTION

According to one embodiment of this invention, a method comprises the steps of: providing a thermoplastic encapsulate comprising at least a first opening; attaching a retention component to the thermoplastic encapsulate; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to another embodiment of this invention, a method comprises the steps of: providing a thermoplastic encapsulate comprising at least a first opening; attaching a retention component to the first opening of the thermoplastic encapsulate; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to another embodiment of this invention, a method comprises the steps of: providing a thermoplastic encapsulate comprising at least a first opening; forming a retention component of a composition that is harder than the thermoplastic encapsulate; attaching a retention component to the thermoplastic encapsulate; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to another embodiment of this invention, a method comprises the steps of: providing a thermoplastic encapsulate comprising at least a first opening; forming a retention component of a thermoplastic; attaching a retention component to the thermoplastic encapsulate; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to another embodiment of this invention, a method comprises the steps of: providing a thermoplastic encapsulate comprising at least a first opening; forming a retention component of a thermoplastic; attaching a retention component to the thermoplastic encapsulate using an overmolding process; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to another embodiment of this invention, a method comprises the steps of: providing a thermoplastic encapsulate comprising at least a first opening; forming a retention component of a thermoplastic; attaching a retention component to the thermoplastic encapsulate using a co-injection molding process; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to one embodiment of this invention, a method comprises the steps of: providing a thermoplastic encapsulate comprising at least a first opening; attaching a retention component to the thermoplastic encapsulate; forming a thermoplastic heat stake of a composition that is harder than the thermoplastic encapsulate; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to another embodiment of this invention, a method comprises the steps of: providing a thermoplastic encapsulate comprising at least a first opening; attaching a retention component to the thermoplastic encapsulate; forming a thermoplastic heat stake of a composition that has a higher melting point than the thermoplastic encapsulate; inserting a thermoplastic heat stake having a first end through the first opening so that the first end extends through the first opening; heating the first end of the thermoplastic heat stake; and, deforming the first end of the thermoplastic heat stake to overlap or surround at least part of the retention component.

According to one embodiment of this invention, a method comprises the steps of: providing a first automotive part comprising at least a first thermoplastic encapsulate having a first opening; attaching a first retention component to the first thermoplastic encapsulate adjacent to the first opening; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to another embodiment of this invention, a method comprises the steps of: providing a first automotive part comprising at least a first thermoplastic encapsulate having a first opening; forming a first retention component of a composition that is harder than the first thermoplastic encapsulate; attaching the first retention component to the first thermoplastic encapsulate adjacent to the first opening; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to another embodiment of this invention, a method comprises the steps of: providing a first automotive part comprising at least a first thermoplastic encapsulate having a first opening; attaching a first retention component to the first thermoplastic encapsulate adjacent to the first opening; forming a thermoplastic heat stake of a composition that has a higher melting point than the thermoplastic encapsulate; providing a second automotive part comprising at least the first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to another embodiment of this invention, a method comprises the steps of: providing a first automotive part comprising at least a first thermoplastic encapsulate having a first opening; forming a thermoplastic heat stake of a composition that has a higher melting point than the thermoplastic encapsulate; attaching a first retention component to the first thermoplastic encapsulate adjacent to the first opening; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to another embodiment of this invention, a method comprises the steps of: providing a first automotive part comprising at least a first thermoplastic encapsulate having a first opening; attaching a first retention component to the first thermoplastic encapsulate such that the first retention component substantially encircles the first opening; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to one embodiment of this invention, a method comprises the steps of: providing a first automotive part comprising at least a first thermoplastic encapsulate having a first opening; forming a first retention component of a thermoplastic; attaching the first retention component to the first thermoplastic encapsulate adjacent to the first opening; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to another embodiment of this invention, a method comprises the steps of: providing a first automotive part comprising at least a first thermoplastic encapsulate having a first opening; forming a first retention component of a thermoplastic; attaching the first retention component to the first thermoplastic encapsulate adjacent to the first opening using an over-molding process; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to another embodiment of this invention, a method comprises the steps of: providing a first automotive part comprising at least a first thermoplastic encapsulate having a first opening; forming a first retention component of a thermoplastic; attaching the first retention component to the first thermoplastic encapsulate adjacent to the first opening using a co-injection molding process; providing a second automotive part comprising at least a first thermoplastic heat stake having a first end; inserting the first thermoplastic heat stake through the first opening so that the first end extends through the first opening; heating the first end of the thermoplastic heat stake; and, deforming the first end of the thermoplastic heat stake to at least partially overlap the retention component.

According to one embodiment of this invention, a vehicle comprises a first automotive part and a second automotive part. The first automotive part comprises a first thermoplastic encapsulate having a first opening and a first retention component adjacent to the first opening. The second automotive part comprises a first thermoplastic heat stake that comprises a first end. The thermoplastic heat stake is received within the first opening of the first automotive part such that the first end extends through the first opening. When the first end of the first thermoplastic heat stake is heated, the first end of the first thermoplastic heat stake deforms to at least partially cover the first retention component and to form a mechanical coupling of the first automotive part to the second automotive part.

According to another embodiment of this invention, a vehicle comprises a first automotive part and a second automotive part. The first automotive part comprises a first thermoplastic encapsulate having a first opening and a first retention component adjacent to the first opening and a second thermoplastic encapsulate having a second opening and a second retention component. The second automotive part comprises a first thermoplastic heat stake that comprises a first end and a second thermoplastic heat stake that comprises a second end. The first and second thermoplastic heat stakes are received within the first and second opening of the first automotive part such that the first end extends through the first opening and the second end extends through the second opening. When the first and second ends of the first and second thermoplastic heat stakes are heated, the first and second ends of the first and second thermoplastic heat stakes deform to at least partially cover the first and second retention components respectively and to form a mechanical coupling of the first automotive part to the second automotive part.

According to one embodiment of this invention, a vehicle comprises a first automotive part and a second automotive part. The first automotive part comprises a first thermoplastic encapsulate having a first opening and a first retention component adjacent to the first opening. The second automotive part comprises a first thermoplastic heat stake that comprises a first end. The thermoplastic heat stake is received within the first opening of the first automotive part such that the first end extends through the first opening. When the first end of the first thermoplastic heat stake is heated, the first end of the first thermoplastic heat stake deforms to substantially cover the first retention component and to form a mechanical coupling of the first automotive part to the second automotive part.

According to one embodiment of this invention, a vehicle comprises a first automotive part and a second automotive part. The first automotive part comprises a first thermoplastic encapsulate having a first opening and a first retention component adjacent to the first opening. The second automotive part comprises a first thermoplastic heat stake that comprises a first end. The thermoplastic heat stake is received within the first opening of the first automotive part such that the first end extends through the first opening. When the first end of the first thermoplastic heat stake is heated, the first end of the first thermoplastic heat stake deforms to at least partially cover the first retention component without the first thermoplastic heat stake contacting the first thermoplastic encapsulate and to form a mechanical coupling of the first automotive part to the second automotive part.

One advantage of this invention is that the retention component provides an increased retention force for the mechanical coupling of parts.

Another advantage of this invention is that the retention component may be comprised of a different composition than that of either the encapsulate or the heat-stake. This allows a person of skill in the art to choose the specific composition of the retention component based on a variety of factors and considerations, such as required retention force and cost, specific to any one application.

Still another advantage of this invention is that the retention component optimizes the load transfer between the molding and the encapsulate and allows this load to be spread over a greater surface area than conventional heat-stake methods.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
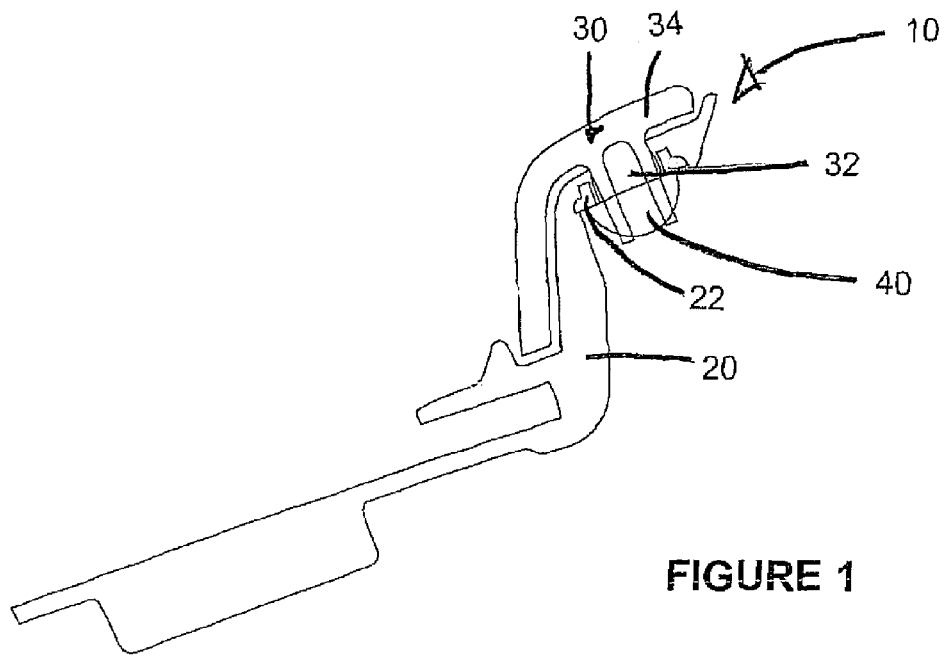
FIG. 1 is a plan view showing a heat-stake and an encapsulate mechanically coupled according to one embodiment of the invention.
Figure 2:
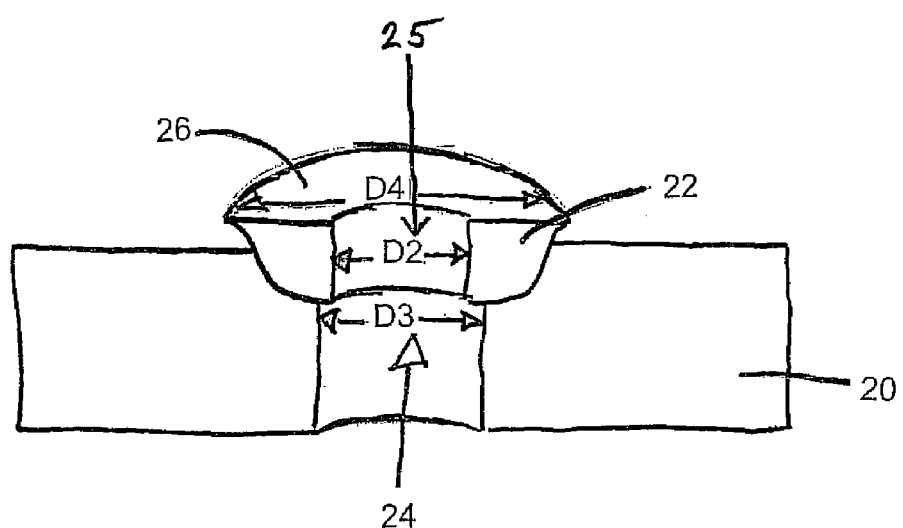
FIG. 2 is a cross sectional view of an encapsulate and retention component according to one embodiment of the invention.
Figure 3:
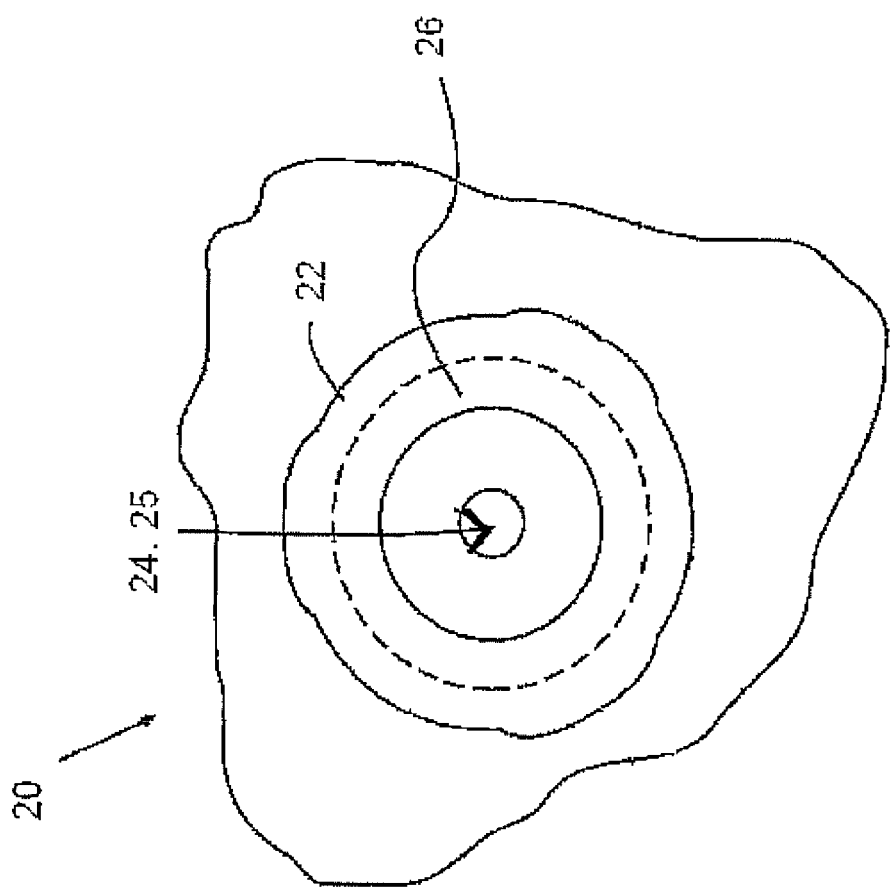
FIG. 3 is a top view of the sectional view shown in FIG. 2.
Figure 4:
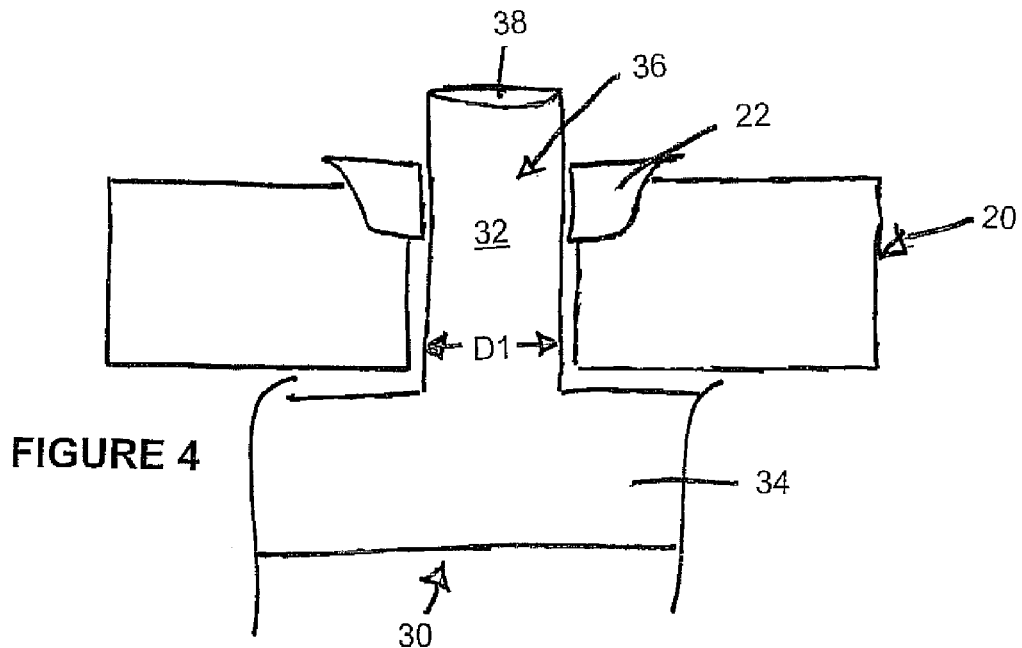
FIG. 4 is a cross sectional view of a heat-stake, encapsulate and retention component prior to becoming mechanically coupled according to one embodiment of the invention.
Figure 5:
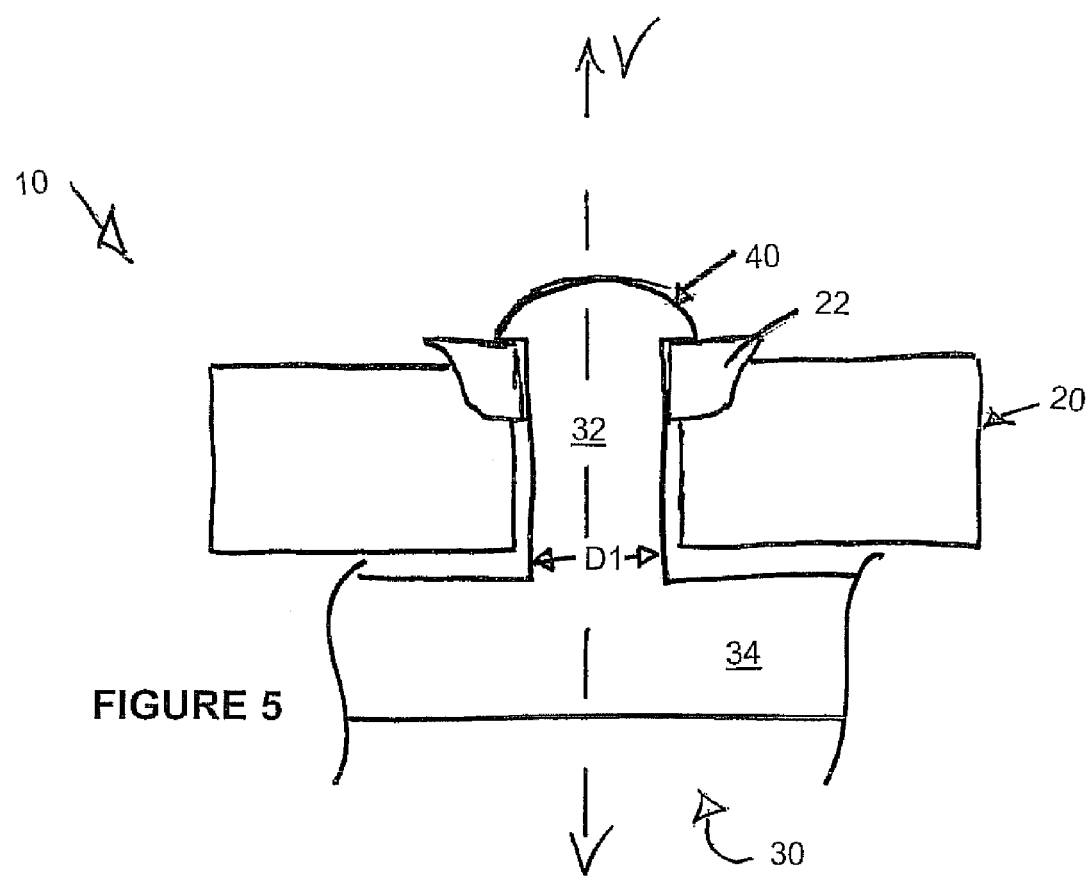
FIG. 5 is a cross sectional view of a heat-stake, encapsulate and retention component mechanically coupled according to one embodiment of the invention.
Figure 6:
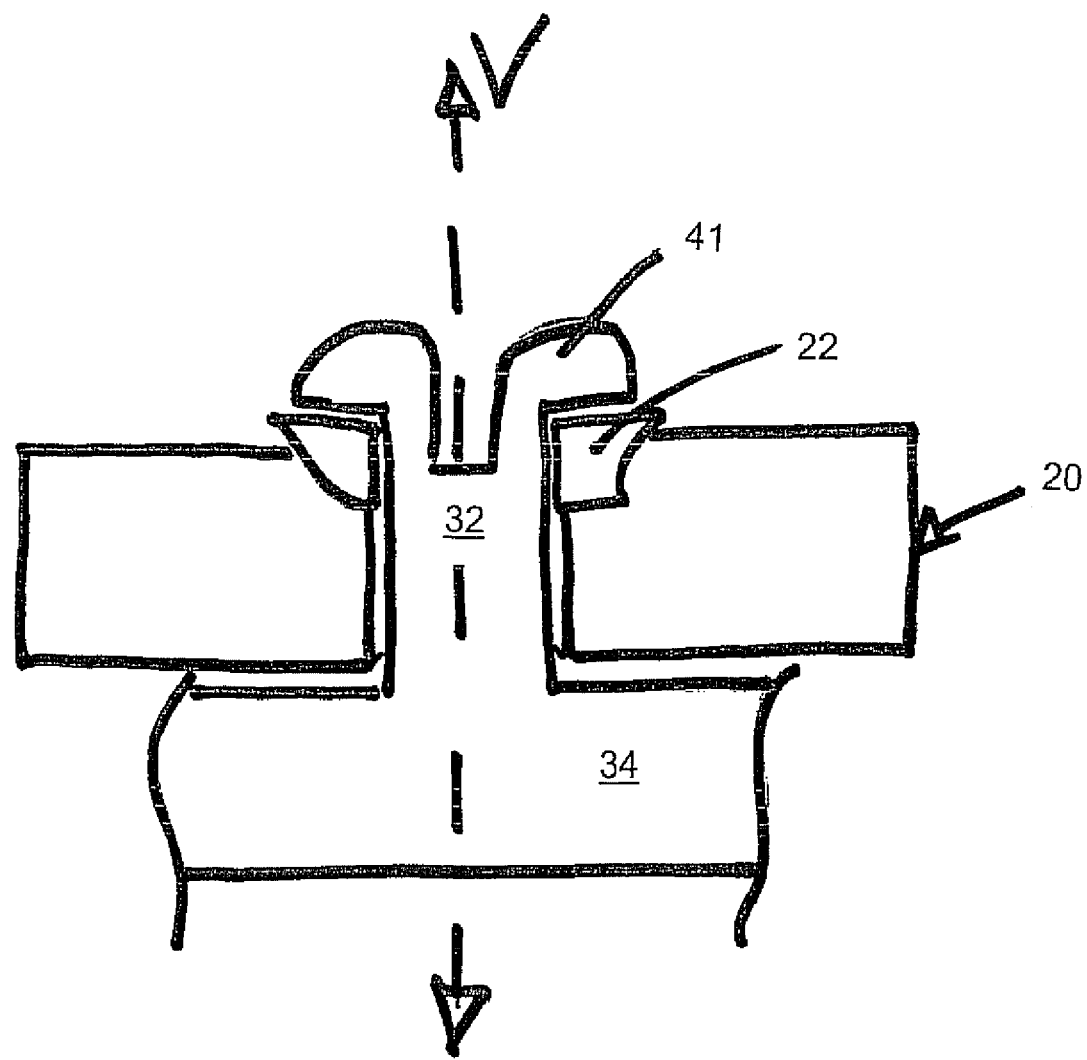
FIG. 6 is a cross sectional view of a heat-stake, encapsulate and retention component mechanically coupled utilizing a hollow stake shape according to one embodiment of the invention.
Figure 7:
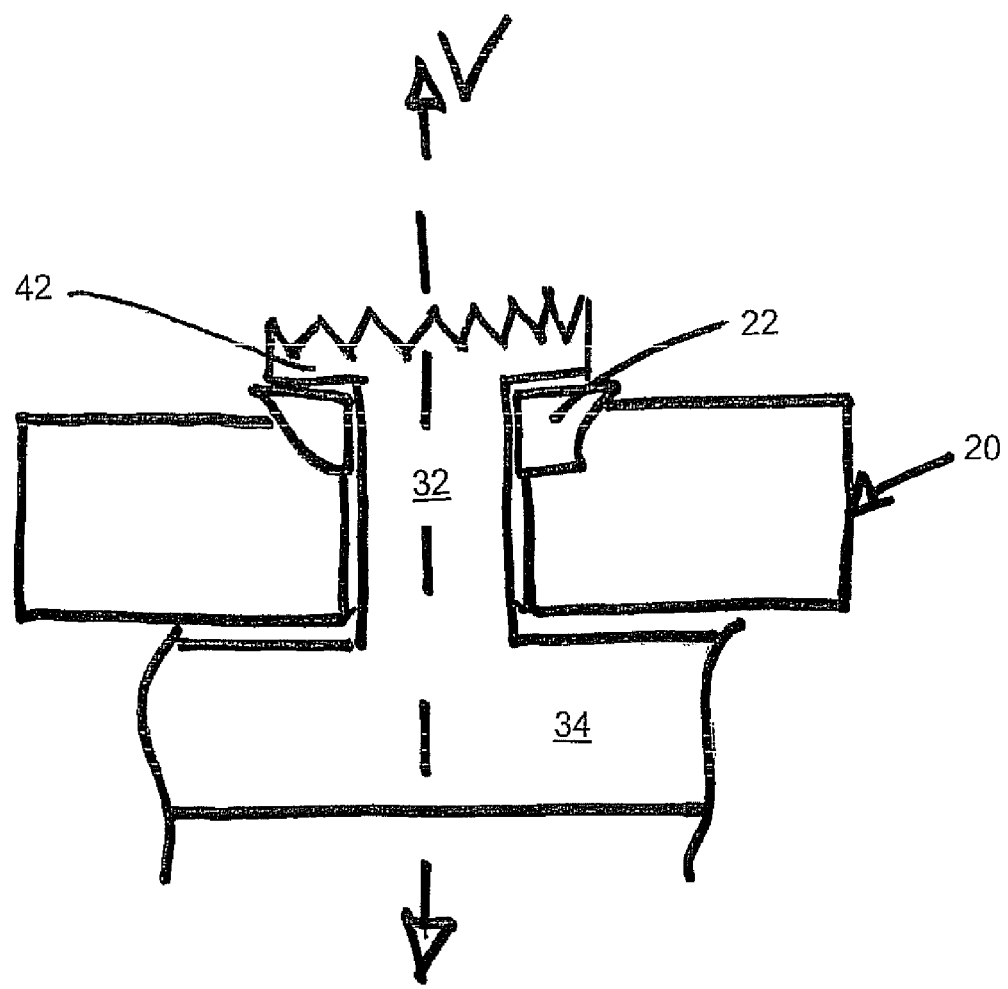
FIG. 7 is a cross sectional view of a heat-stake, encapsulate and retention component mechanically coupled utilizing a knurled stake shape according to one embodiment of the invention.

Referring now to the drawings wherein the showings are for purposes of illustrating embodiments of the invention only and not for purposes of limiting the same, FIG. 1 shows a fastened work-piece 10 comprising a heat stake 30, an encapsulate 20, and a retention component 22 according to one embodiment of the invention. The heat-stake 30 may comprise a base portion 34 and a shaft portion 32. Shaft portion 32 may be positioned substantially perpendicular to base portion 34. The angle of shaft portion 32 with respect to base portion 34 is not intended to limit the invention as other useful angles will become apparent to persons of ordinary skill in the art. The heat-stake 30 may be formed of a rigid plastic material such as a polypropylene, nylon, or Acrylnitril-Butadien_Styrol-Copolymere (ABS) or any similar material chosen with sound engineering judgment. It will be appreciated that the invention is not limited by the type of material, and that the invention can be practiced with any suitable deformable material that can allow the user to stake the heat-stake 30 in a uniform and consistent manner. The term "stake" is generally applied to a staking operation that includes any one of a plurality of fastening methods known in the art, such as conventional welding, ultrasonic welding, and hot staking.

With reference now to FIGS. 1-5, the encapsulate 20 may comprise an encapsulate central passage 24. In one embodiment, the encapsulate 20 may be formed of a different material than that used to form heat-stake 30. The encapsulate 20 may be formed of a material that is softer than that used to form heat-stake 30 or one that has a lower melting point. The hardness of a material may be determined by determining the material's indentation hardness, the size of an indention made by an indention tool under a fixed load, or any other method chosen with sound engineering judgment. A material's melting point may be determined by any known method for determining melting point. Similarly, the composition of the encapsulate 20 can be varied with respect to the composition of the heat-stake 30 based on properties such as vicat hardness, apparent melting point, etc.

With continuing reference to FIGS. 1-5, the retention component 22 may comprise a component central passage 25. In one embodiment, the component central passage 25 may at least partially encircle, surround, or overlap with central passage 24 such that at least a minimum area for allowing the heat stake 30 to be inserted through the encapsulate 20 and the retention component 22 may be formed. Other embodiments may comprise the retention component 22 substantially encircling, surrounding, or overlapping with the encapsulate central passage 24 such that the component central passage 25 is substantially aligned with the encapsulate central passage 24 such that a maximum area for allowing the heat stake 30 to be inserted through the encapsulate 20 and the retention component 22 may be formed. The retention component 22 may comprise a fastening surface 26. The encapsulate 20 may be formed of a rigid plastic material such as a polypropylene, nylon, or Acrylnitril-Butadien_Styrol-Copolymere (ABS) or any similar material chosen with sound engineering judgment. In one embodiment, the retention component 22 may be formed of a different material than that used to form the encapsulate 20. The retention component 22 may be formed of a harder material than that used to form encapsulate 20. The retention component 22 may be attached to encapsulate 20 by an over-molding, co-injection molding, or two-shot molding process or any process chosen with sound engineering judgment.

With continuing reference to FIGS. 1-5, the shaft portion 32 extends through the encapsulate central passage 24 and the component central passage 25. The retention component 22 may substantially encircle the encapsulate central passage 24 as well as the shaft portion 32. The shaft portion 32 may have a shaft diameter D1, shown in FIGS. 4-5, that is less than the component passage inner diameter D2, shown in FIG. 2. The encapsulate central passage 24 may have an encapsulate central passage inner diameter D3, shown in FIG. 2, that is greater than the component passage inner diameter D2 but less than the retention component outer diameter D4. Other embodiments of the invention include the retention component 22 having a component passage inner diameter D2 equal to the encapsulate central passage inner diameter D3. And yet other embodiments of the invention include component passage 25 having a component passage inner diameter D2 greater than the encapsulate central passage inner diameter D3. The cylindrical shape of the shaft portion 32, the retention component 22, the component passage 25, and the encapsulate central passage 24 is not intended to limit the scope of the invention and any shape, chosen with sound engineering judgment, may be used.

Figure 8:
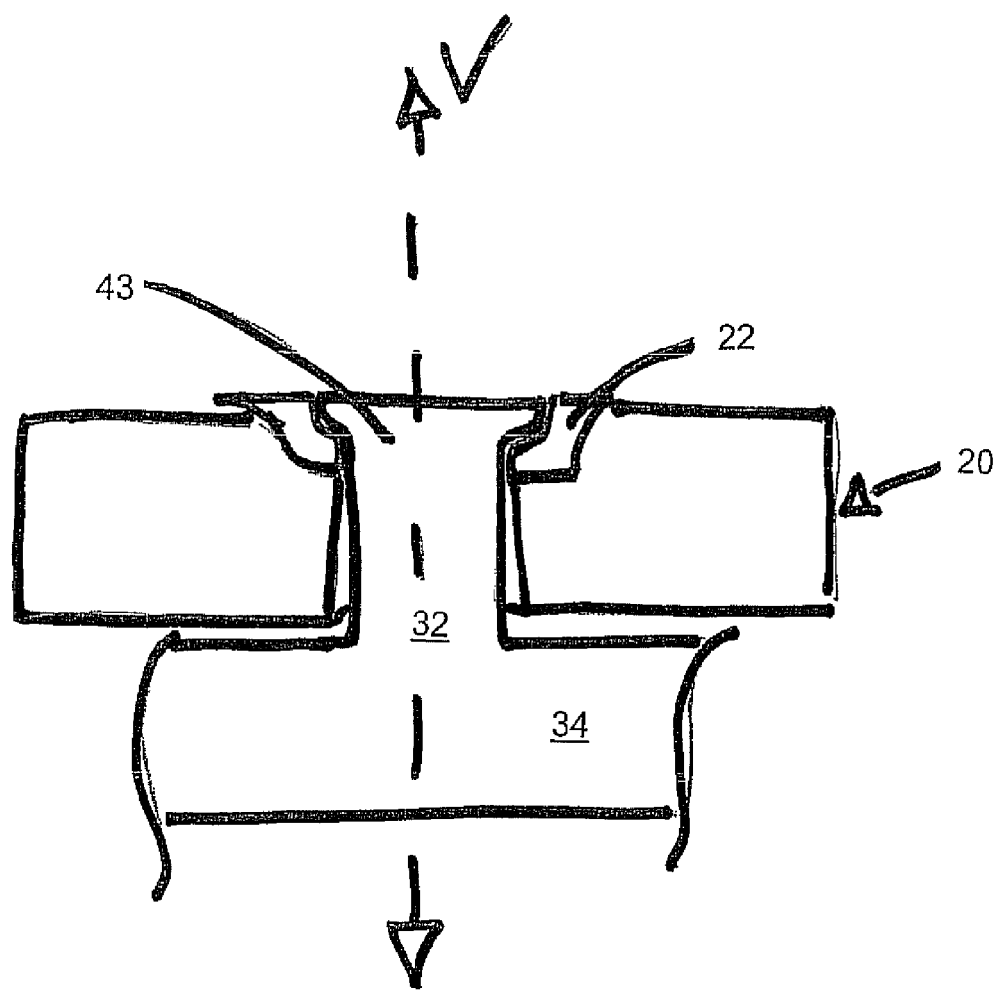
FIG. 8 is a cross sectional view of a heat-stake, encapsulate and retention component mechanically coupled utilizing a flush stake shape according to one embodiment of the invention.
Figure 10:
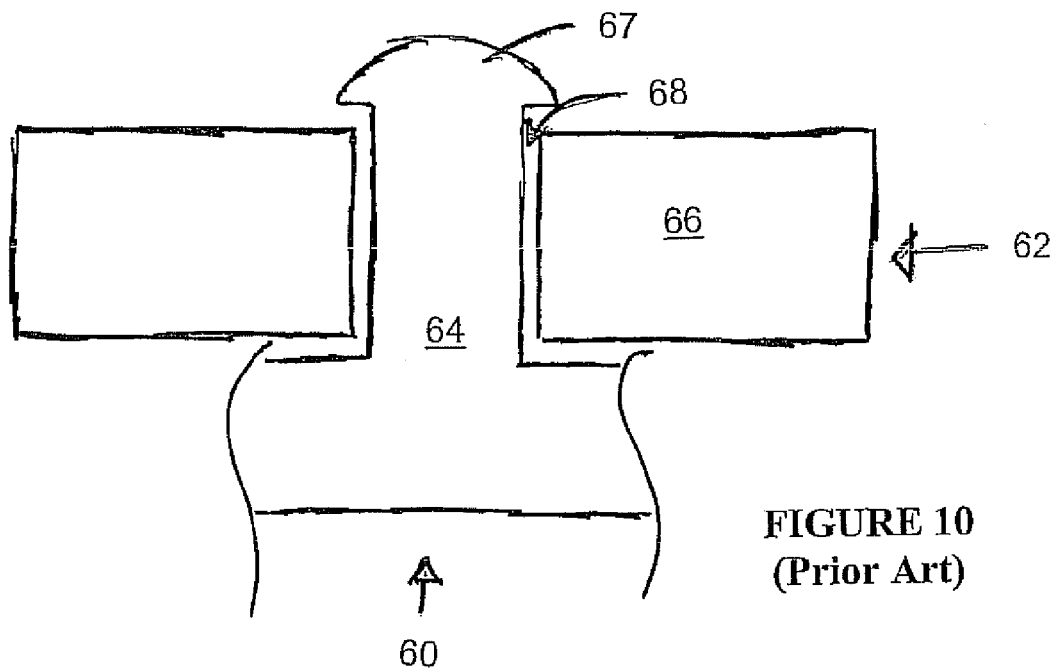
FIG. 10 illustrates a prior art heat-stake and encapsulate showing the deformation of a leading end of the heat-stake such that a mushroom cap is formed.
Figure 9:
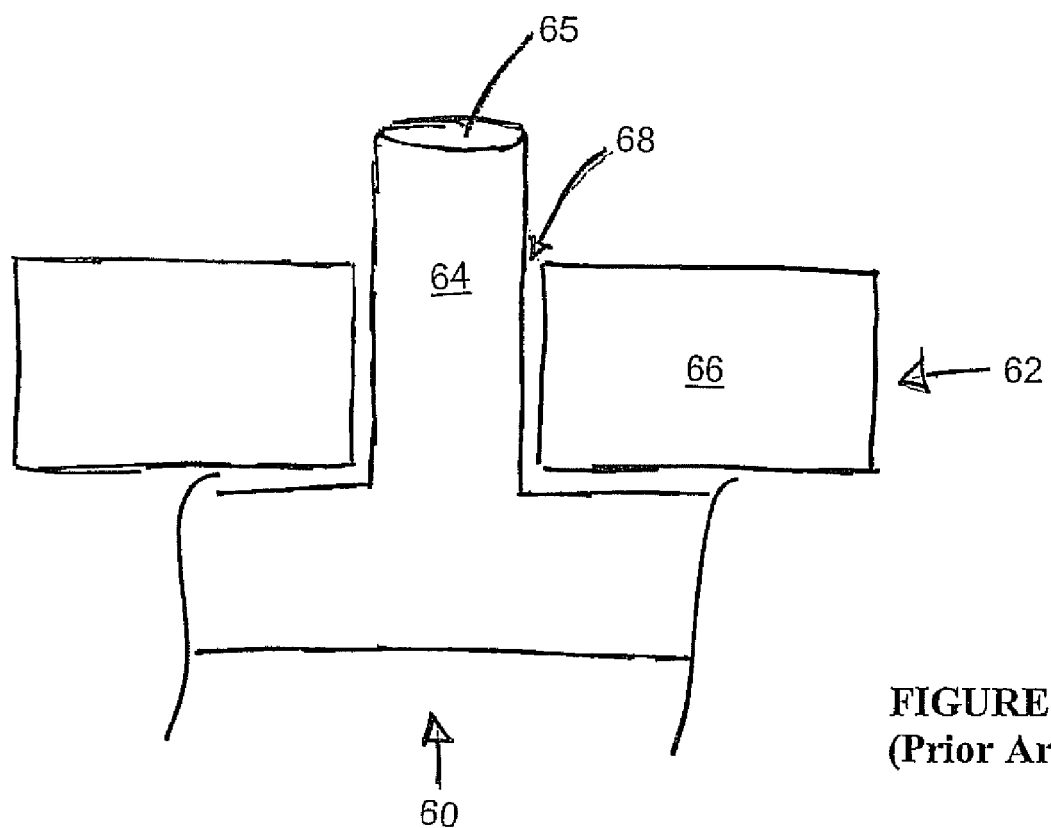
FIG. 9 illustrates a prior art heat-stake and encapsulate prior to the heat treatment of a leading end by use of a staking device.

With reference now to FIGS. 1-8, the staking operation may be performed by attaching the retention component 22 to the encapsulate 20. In one embodiment, the retention component 22 may be attached to the encapsulate 20 by an over-molding process. In another embodiment, the retention component 22 may be attached to the encapsulate 20 through a co-injection molding process. Any known method for attaching the retention component 22 to the encapsulate 20 may be used chosen with sound engineering judgment. The leading end 36 of heat-stake 30 may then be inserted through the encapsulate central passage 24 and the component central passage 25 such that the retention component 22 at least partially encircles shaft portion 32. In one embodiment, a shaping device (not shown) may first be heated and then applied to the central portion 38 of shaft portion 32 about leading end 36 of heat-stake 30. The shaping device transfers heat to the heat-stake 30 thereby softening the shaft portion 32 while substantially simultaneously shaping the shaft portion 32 to form a deformed portion 40. Other embodiments may comprise applying heat directly to the shaft portion 32 and utilizing a staking device (not shown) to deform shaft portion 32 vertically downward and radially outward about the vertical axis V toward the fastening surface 26 of the retention component 22. The heat may be applied in the form of hot air or any other known method chosen with sound engineering judgment. The deformed portion 40 may comprise a mushroom-cap shape or any other shape that enables the mechanical coupling of heat-stake 30 and encapsulate 20 such as a hollow stake shape 41 (FIG. 6), a knurled stake shape 42 (FIG. 7), or a flush stake shape 43 (FIG. 8). Inherent characteristics that may contribute to the resulting shape of deformed portion 40 include the material used to comprise heat-stake 30 as well as shaft diameter D1 of shaft portion 32. The shaft diameter D1 may be of sufficient thickness so that the deformed portion 40 engages substantially the entire area comprising the fastening surface 26. The shaft diameter D1 may be of any thickness chosen with sound engineering judgment. Because the shaft portion 32 has a generally solid outer surface 39, once deformed it applies a substantially uniform and continuous pressure to the fastening surface 26, thereby providing a generally fastened work-piece 10.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A method of manufacturing an assembly by heat staking comprising the steps of:
   (a) providing a work-piece comprising first and second parts;
   (b) providing a thermoplastic heat stake comprising a base portion attached to the first part and a shaft portion that extends from the base portion;
   (c) providing a thermoplastic encapsulate attached to the second part and comprising at least a first opening;
   (d) over-molding or co-injection molding a thermoplastic retention component onto the thermoplastic encapsulate, wherein the retention component has a passage;
   (e) after step (d), inserting the shaft portion having a first end through the first opening so that the first end extends through the first opening and through the passage in the thermoplastic retention component so that the first end extends beyond the first opening and the passage;

(f) after step (e), heating the first end of the inserted shaft portion; and;

(g) after step (f), deforming the heated first end of the inserted shaft portion to at least partially overlap the thermoplastic retention component and to connect the first part to the second part.

2. The method of claim 1, wherein step (d) comprises the step of:
over-molding or co-injection molding the retention component of a composition that is harder than the thermoplastic encapsulate.

3. The method of claim 1, wherein step (d) comprises the step of:
using an over-molding process to attach the retention component to the thermoplastic encapsulate.

4. The method of claim 1, wherein step (d) comprises the step of:
using a co-injection molding process to attach the retention component to the thermoplastic encapsulate.

5. The method of claim 1, wherein step (b) comprises the step of:
forming the thermoplastic heat stake of a composition that is harder than the thermoplastic encapsulate.

6. The method of claim 1, wherein step (b) comprises the step of:
forming the thermoplastic heat stake of a composition that has a higher melting point than the thermoplastic encapsulate.

7. A method of manufacturing an assembly by heat staking comprising the steps of:
(a) providing first and second automotive parts;
(b) providing a thermoplastic heat stake comprising a base portion attached to the first automotive part and a shaft portion having a first end that extends from the base portion;
(c) providing a thermoplastic encapsulate attached to the second automotive part and having a first opening;
(d) over-molding or co-injection molding a thermoplastic retention component onto the thermoplastic encapsulate, wherein the retention component has a passage and is adjacent the first opening;
(e) after step (d), inserting the shaft portion through the first opening so that the first end extends through the first opening and through the passage in the thermoplastic retention component so that the first end extends beyond the first opening and the passage;
(f) after step (e), heating the first end of the inserted shaft portion; and,
(g) after step (f), deforming the heated first end of the inserted shaft portion to at least partially overlap the thermoplastic retention component and to connect the first automotive part to the second automotive part.

8. The method of claim 7, wherein step (d) comprises the step of:
over-molding or co-injection molding the retention component of a composition that is harder than the thermoplastic encapsulate.

9. The method of claim 7, wherein step (b) comprises the step of:
forming the thermoplastic heat stake of a composition that is harder than the thermoplastic encapsulate.

10. The method of claim 7, wherein step (b) comprises the step of:
forming the thermoplastic heat stake of a composition that has a higher melting point than the thermoplastic encapsulate.

11. The method of claim 7, wherein step (e) comprises the step of:
over-molding or co-injection molding the retention component such that the retention component substantia encircles the first opening.

12. The method of claim 7, wherein step (e) comprises the step of:
using an over-molding process to attach the retention component to the thermoplastic encapsulate.

13. The method of claim 7, wherein step (e) comprises the step of:
using a co-injection molding process to attach the retention component to the thermoplastic encapsulate.

14. The method of claim 1 wherein:
step (d) comprises the step of: providing the retention component with an upper surface that defines a fastening surface; and,
step (g) comprises the step of: engaging the entire upper surface of the retention component with the deformed portion of the shaft portion.

15. The method of claim 7 wherein:
step (d) comprises the step of: providing the retention component with an upper surface that defines a fastening surface; and,
step (g) comprises the step of: engaging the entire upper surface of the retention component with the deformed portion of the shaft portion.

16. The method of claim 1 wherein:
step (c) comprises the step of: providing the first opening with a first diameter;
step (d) comprises the step of: providing the passage with a second diameter that is less than the first diameter; and,
step (d) comprises the step of: extending a portion of the retention component within the first opening of the thermoplastic encapsulate.

17. The method of claim 7 wherein:
step (c) comprises the step of: providing the first opening with a first diameter;
step (d) comprises the step of: providing the passage with a second diameter that is less than the first diameter; and,
step (d) comprises the step of: extending a portion of the retention component within the first opening of the thermoplastic encapsulate.

* * * * *